(12) United States Patent
Callens et al.

(10) Patent No.: US 7,627,073 B2
(45) Date of Patent: Dec. 1, 2009

(54) METHOD FOR DESIGNING A NUCLEAR FUEL ASSEMBLY WITH DAMPING GUIDE TUBE

(75) Inventors: Catherine Callens, Lyons (FR); Hélène Segura, Lyons (FR)

(73) Assignee: Framatome ANP, Courbevoie (FR)

( * ) Notice: Subject to any disclaimer, the term of this patent is extended or adjusted under 35 U.S.C. 154(b) by 0 days.

(21) Appl. No.: 10/506,481

(22) PCT Filed: Feb. 25, 2003

(86) PCT No.: PCT/FR03/00608

§ 371 (c)(1),
(2), (4) Date: Jul. 13, 2005

(87) PCT Pub. No.: WO03/075283

PCT Pub. Date: Sep. 12, 2003

(65) Prior Publication Data

US 2006/0165208 A1 Jul. 27, 2006

(30) Foreign Application Priority Data

Mar. 1, 2002 (FR) .................................. 02 02660

(51) Int. Cl.
*G21C 7/06* (2006.01)
(52) U.S. Cl. .................. 376/234; 376/224; 376/225; 376/207
(58) Field of Classification Search ................. 376/234, 376/235, 224, 225, 207
See application file for complete search history.

(56) References Cited

U.S. PATENT DOCUMENTS 3,762,994 A * 10/1973 Kunzel ........................ 376/234
3,779,134 A * 12/1973 Daublebsky et al. ........ 376/235
3,830,694 A * 8/1974 Acher ......................... 376/230
3,843,471 A * 10/1974 Flinn ........................... 376/258
3,562,109 A    2/1981 Bezold et al.
5,076,995 A   12/1991 Canat

FOREIGN PATENT DOCUMENTS

EP        0 971 364        1/2000

OTHER PUBLICATIONS

Design and Construction Rules for Fuel Assemblies of PWR Nuclear Power Plants, 1998, Chapter 6: Fuel System Design, p. 239.
United States Nuclear Regulatory Commission, Appendix B to Part 50—Quality Assurance Criteria for Nuclear Plants and Fuel Reprocessing Plants, Dec. 14, 2007.

* cited by examiner

*Primary Examiner*—Rick Palabrica
(74) *Attorney, Agent, or Firm*—Davidson, Davidson & Kappel, LLC

(57) ABSTRACT

A method to design a nuclear fuel assembly having the following steps including establishing the falling speed of the control rod upon entry into the lower damping portion when the control cluster falls in the event of a shutdown of the nuclear reactor, establishing, based on the falling speed established in step a), the progression of the falling speed of the control rod in the lower damping portion, establishing, based on the progression of the speed established in step b), a maximum elevated pressure produced in the liquid contained in the lower damping portion, and establishing, based on the maximum elevated pressure established in step c), a maximum circumferential stress produced in the lower damping portion.

8 Claims, 6 Drawing Sheets

METHOD FOR DESIGNING A NUCLEAR FUEL ASSEMBLY WITH DAMPING GUIDE TUBE

FIELD OF THE INVENTION

The present invention relates to a method for designing a nuclear fuel assembly which is intended to be positioned in a nuclear reactor, the assembly comprising a plurality of guide tubes, and a control cluster which itself comprises a plurality of control rods and a support for control rods, the control rods and the guide tubes extending in parallel with a longitudinal direction, each control rod being received in a guide tube in order to form pairs comprising guide tubes/control rods, each guide tube comprising a lower damping portion which comprises at least a portion of reduced inside diameter, which portion is intended to contain a fluid for damping the fall of the control rod which is received in the guide tube, the portion of reduced inside diameter surrounding the control rod with a radial passage gap when the control rod enters the guide tube.

BACKGROUND INFORMATION

It will be appreciated that nuclear fuel assemblies must be dependable in order to allow reliable operation of nuclear reactors. Thus, design and construction provisions for such assemblies have been drawn up.

These provisions impose a general framework and minimum criteria which the assembly constructors must take into consideration.

As far as the guide tubes are concerned, the design provisions require verification that they remain stable under axial compression and that the mechanical integrity thereof is not affected during such compression. These criteria are aimed in particular at taking into consideration the axial compression of the guide tubes which results from contact against the upper bearing plate of the core by springs carried by an upper end piece of the assembly.

Although the criteria imposed by the design provisions allow assemblies to be designed with satisfactory reliability, these are merely minimum criteria and it is desirable to develop a method which allows even more reliable assemblies to be designed.

For all that, it is also desirable to reduce the safety margins during design in order to reduce the mass and the cost of the assemblies constructed.

SUMMARY OF THE INVENTION

An objective of the invention is to overcome this problem by providing a method which allows nuclear fuel assemblies which are more reliable to be designed, while limiting the design margins.

To this end, the invention relates to a method for designing a nuclear fuel assembly which is intended to be positioned in a nuclear reactor, the assembly comprising a plurality of guide tubes, and a control cluster which itself comprises a plurality of control rods and a support for control rods, the control rods and the guide tubes extending in parallel with a longitudinal direction, each control rod being received in a guide tube in order to form pairs comprising guide tubes/control rods, each guide tube comprising a lower damping portion which comprises at least a portion of reduced inside diameter, which portion is intended to contain a fluid for damping the fall of the control rod which is received in the guide tube, the portion of reduced inside diameter surrounding the control rod with a radial passage gap when the control rod is introduced in the guide tube, wherein the method comprises, for at least one pair comprising a guide tube/control rod, the following steps:

a) establishing the falling speed of the control rod upon entry into the lower damping portion when the control cluster falls in the event of a shutdown of the nuclear reactor, b) establishing, based on the falling speed established in step a), the progression of the falling speed of the control rod in the lower damping portion, c) establishing, based on the progression of the speed established in step b), a maximum elevated pressure produced in the liquid contained in the lower damping portion, and d) establishing, based on the maximum elevated pressure established in step c), a maximum circumferential stress produced in the lower damping portion.

According to specific embodiments, the method can comprise one or more of the following features, taken in isolation or according to all technically feasible combinations:

- the method further comprises a step for verifying, using the maximum circumferential stress established in step d), that a maximum stress admissible by the guide tube has not been exceeded,
- the establishing step b) is carried out using a higher value for the radial passage gap and the establishing step c) is performed using a lower value for the radial passage gap,
- the higher value is a maximum statistical value for the passage gap,
- the lower value is a minimum statistical value for the passage gap,
- the support of the control cluster comprising a helical spring for damping the impact of the support against an upper end piece of the assembly in the event of the control cluster falling during a shutdown of the nuclear reactor. The method further comprises the following steps:

e) establishing the progression of the speed of the control cluster after the impact of the support against the upper end piece, f) establishing, based on the progression of the speed established in step e), a maximum longitudinal load for compression of the spring, and g) establishing, based on the maximum longitudinal load for compression, at least a maximum shearing stress in the spring,

- a maximum shearing stress is a shearing stress along the neutral axis of the spring,
- a maximum shearing stress is a shearing stress along the axis of the spring nearest the longitudinal center axis thereof,
- the method further comprises a step for verifying, using a maximum shearing stress established in step g), that a maximum stress admissible by the spring has not been exceeded.

The invention further relates to a system for designing a nuclear fuel assembly, characterised in that it comprises an arrangement for performing the steps of a method as defined above.

According to a variant, the system comprises a computer and storage arrangement, in which at least a program comprising instructions for performing steps of the method for designing a nuclear fuel assembly is stored.

The invention further relates to a computer program comprising instructions for performing the steps of a method as defined above.

The invention also relates to a medium which can be used in a computer and on which a program as defined above is recorded.

BRIEF DESCRIPTION OF THE DRAWINGS

The invention will be better understood from a reading of the description below which is given purely by way of example with reference to the appended drawings.

DETAILED DESCRIPTION

Figure 1:
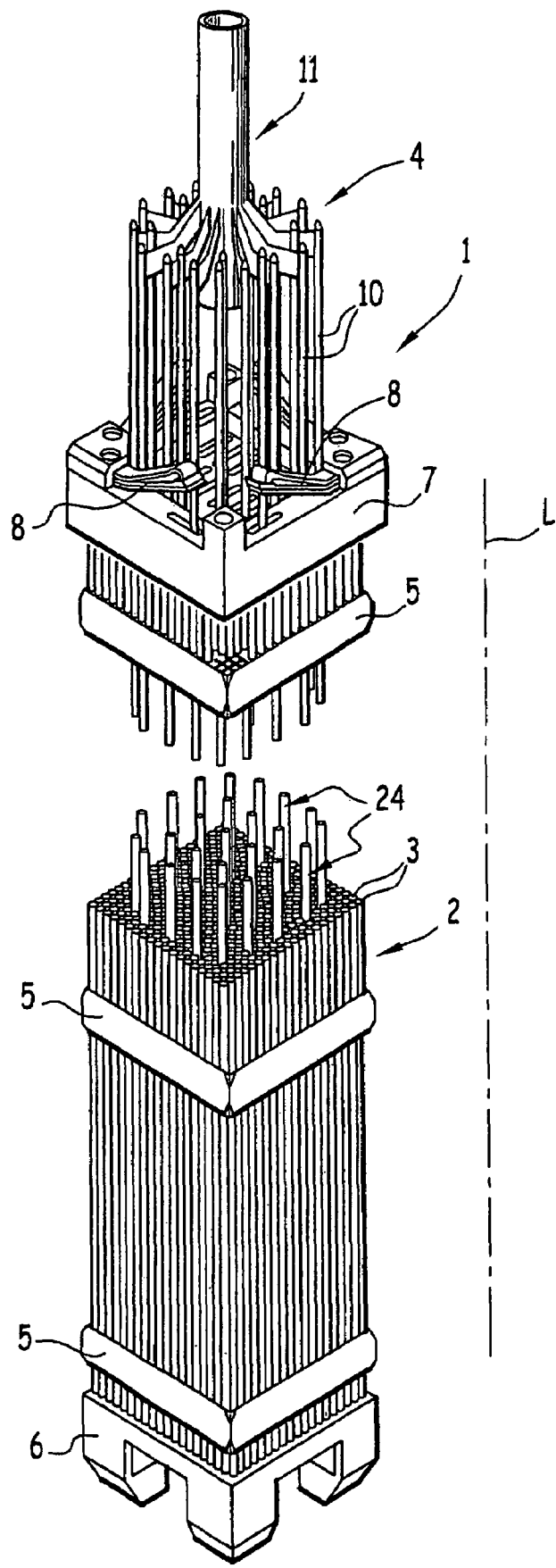
FIG. 1 is a schematic, perspective cut-away view of a nuclear fuel assembly which is designed by a method according to the invention.

FIG. 1 illustrates a nuclear fuel assembly 1 which mainly comprises a square-based lattice 2 for nuclear fuel rods 3 and a control cluster 4.

The assembly 1 comprises grids 5 for maintaining the rods 3, which grids 5 are distributed over the height of the rods 3. A lower end piece 6 is arranged under the lower ends of the rods 3 and an upper end piece 7 above the upper ends of the rods 3. The upper end piece 7 is provided with springs 8 for pressing against the upper bearing plate of the reactor core, in which the assembly 1 is intended to be placed.

The control cluster 4 comprises a plurality of control rods 10, for example, 24. Conventionally, the control rods 10 comprise a material which absorbs neutrons.

The rods 3 and 10 extend in parallel with a vertical longitudinal direction L.

The rods 10 are carried at the upper ends thereof by a support 11 which is generally referred to as a spider.

Figure 2:
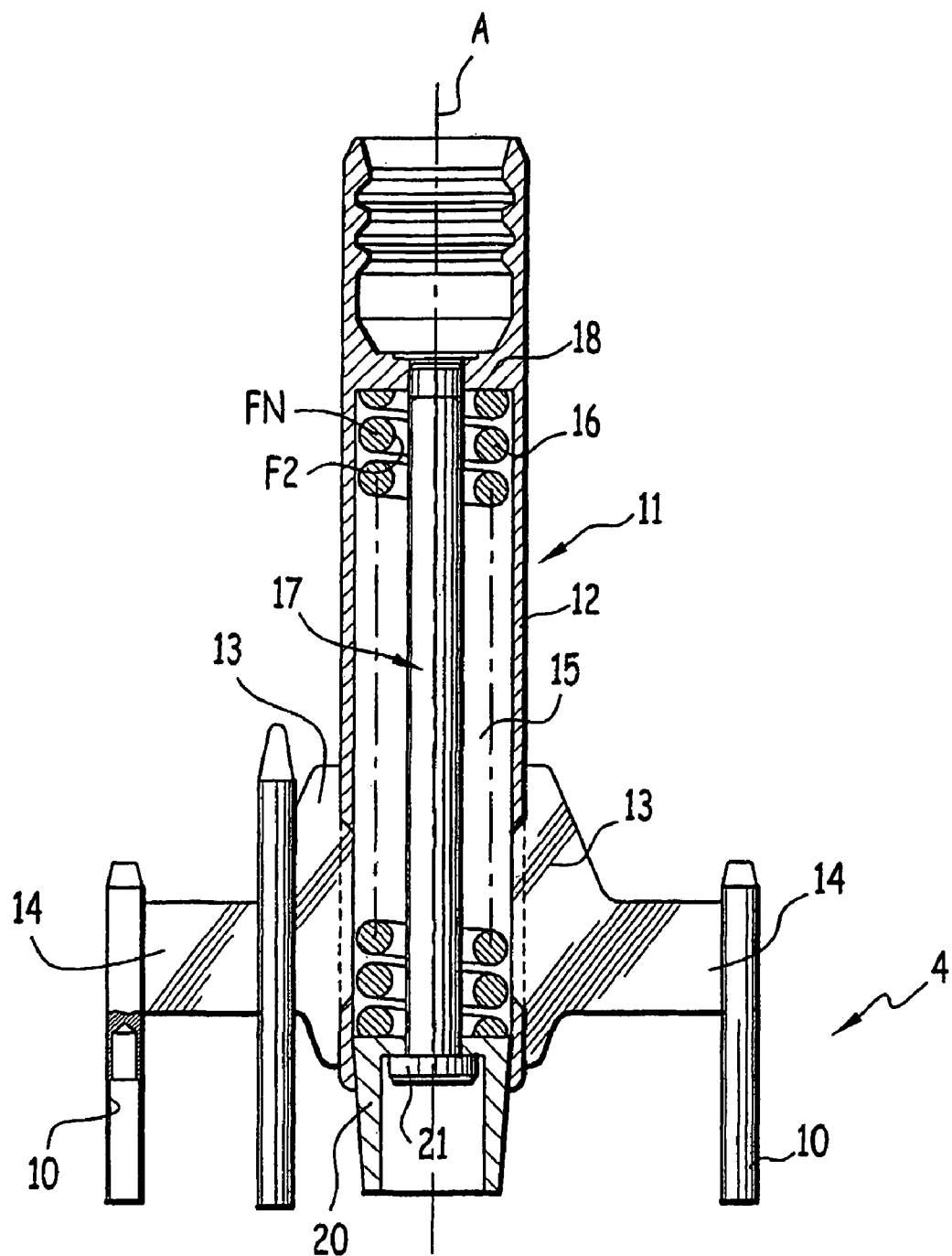
FIG. 2 is a schematic, partially sectioned side view drawn to an enlarged scale of the structure of the spider of the assembly of FIG. 1.

As illustrated more particularly in FIG. 2, the spider 11 comprises a vertical central upper head 12 and a series of arms or vanes 13 which extend radially outwards from the lower end of the upper head 12 as far as the radially outer ends 14 thereof.

Each control rod 10 is connected to an arm 13 at the upper end thereof.

The upper head 12 of the spider 11 has a central blind hole 15 which opens towards the bottom and in which a damping helical spring 16 is received. The spring 16 extends vertically along a center axis A. A tightening screw 17 extends substantially over the entire height of the hole 15 and is screwed into the wall 18 delimiting the upper portion of the hole 15.

The lower portion of the screw 17 extends through the base of a retaining ring 20 which rests on the lower end of the spring 16. The head 21 of the screw 17 rests, at the top, against the base of the retaining ring 20 in order to press the spring 16 against the wall 18 of the upper head 12.

Figure 3:
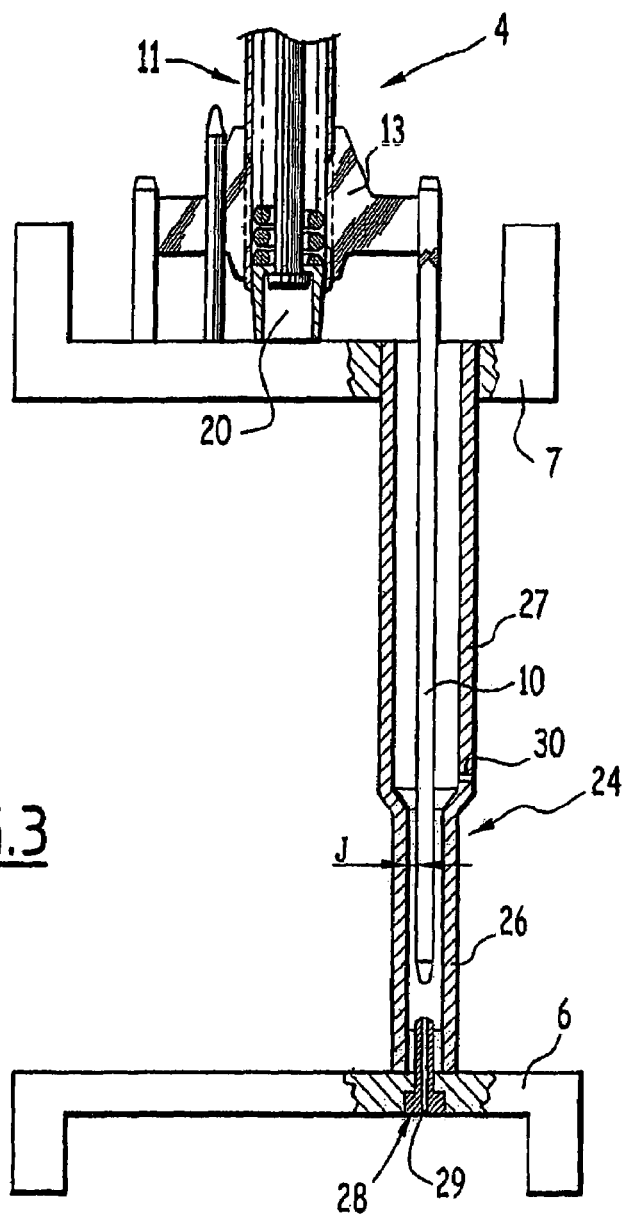
FIG. 3 is a partial schematic side view of the assembly of FIG. 1, illustrating more particularly a pair comprising a guide tube/control rod.

As illustrated in FIG. 3 for a control rod 10, each control rod 10 is received in a respective guide tube 24 which is arranged in the lattice 2 of fuel rods 3. In this manner, 24 pairs comprising a guide tube/control rod are formed. Since each of these pairs has a similar structure, only one will be described below.

The guide tube 24 extends from the lower end piece 6 as far as the upper end piece 7. The guide tube 24 comprises a lower portion 26 of reduced inside diameter and an upper portion 27. The lower portion 26 is connected to the lower end piece 6 by a collared screw 28, through which a vertical through-hole 29 extends.

The lower portion 26 of the guide tube 24 surrounds the control rod 10 with a radial passage gap J.

The upper portion 27 is fixed to the upper end piece 7 and opens at the outside of the assembly 1.

Figure 4:
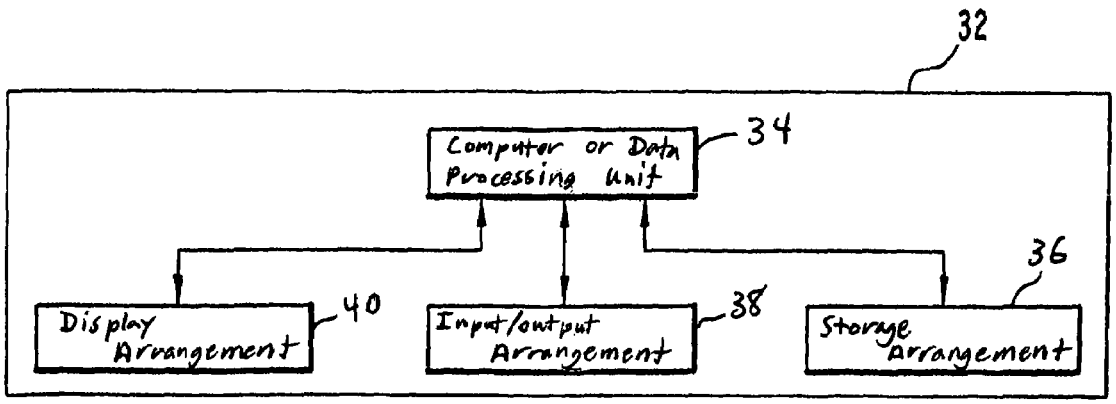
FIG. 4 is a block diagram illustrating the system for designing the assembly in FIG. 1.

Lateral apertures 30, only one of which can be seen in FIG. 4, are provided in the upper portion 27 near the lower portion 26.

When the assembly 1 is placed in a nuclear reactor, the cooling liquid of the reactor fills the interior of the guide tube 24.

Conventionally, the control cluster 4 can be moved vertically relative to the remainder of the assembly 1 in order to allow adjustment of the reactivity during normal operation of the reactor, and therefore variations in power from zero power up to maximum output depending on the vertical introduction of the control rods 10 in the lattice 2 of rods 3. The vertical displacement of the control cluster 24 is conventionally performed by way of a drive rod which is connected to the upper end of the upper head 12.

When the reactor is shut down, the drive rod and the assembly 4 fall due to gravity.

At the start of this falling movement, the control rods 10 are guided only by the upper portions 27 of the guide tubes 24 and have not yet reached the lower portions 26.

Once the falling action has ended, the lower ends of the control rods 10 are introduced in the lower portions 26. The cooling fluid contained in the portions 26 is then violently forced, on the one hand, upwards thereby and, on the other hand, downwards through the apertures 29 of the collared screws 28.

Each lower portion 26 therefore behaves in the manner of a hydraulic damper braking the falling movement of the corresponding control rod 10, and therefore of the assembly 4.

This braking phase ends at the end of the travel path with the impact of the spider 11 against the upper end piece 7 of the assembly 1.

This impact is performed by a the retaining ring 20. During this impact, the spring 16 is compressed vertically in order to absorb the shock.

According to the invention, the assembly 1 has been designed in order to take into consideration the specific stresses brought about in the assembly by the fall of the control cluster 4 during such a shutdown of the reactor.

In this manner, in order to design the assembly 1, in particular a data-processing system 32 has been used, as illustrated schematically in FIG. 4.

This system 32 comprises, for example, a computer or data processing unit 34 comprising one or more processors, storage arrangement 36, input/output arrangement 38, and optionally display arrangement 40.

Instructions which can be performed by the computer 34 are stored in the form of one or more programs in the storage arrangement 36.

These instructions are, for example, instructions in FORTRAN programming code.

Figure 5:
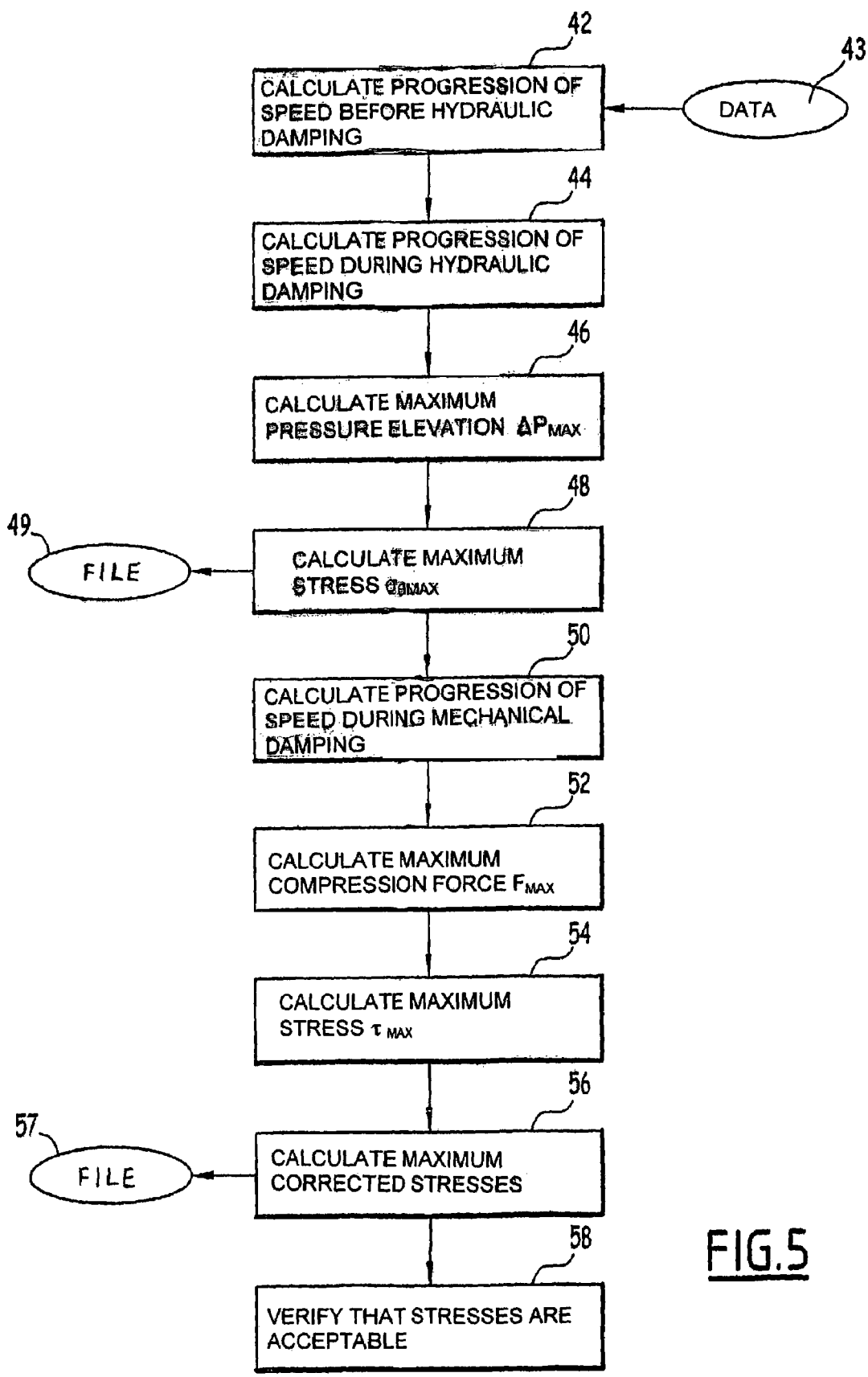
FIG. 5 is a flow chart illustrating successive steps of the design method carried out by the system of FIG. 4.

These various instructions, when they are performed by the computer 34, allow the method illustrated by the flow chart of FIG. 5 to be performed.

In a first step illustrated by the box 42 of this figure, the computer 34 calculates, based on data 43, the progression of the falling speed of a control rod 10 in the upper portion 27 of the corresponding guide tube 24 in the event of a shutdown of the reactor.

This calculation can be performed assuming, for example, that the control rod 10 is first subjected to constant loads:
gravitational force: fg=Mg,
Archimedes' thrust: fa=-ρ gV,
pressure difference in the core: fc, and
mechanical friction: fm, where M and V are the mass and the volume, respectively, of the assembly 4 and the drive rod thereof.

The control rod 10 is also subjected to loads as a function of the speed or position thereof, for example, hydraulic friction which can be obtained from: fh=-c1 (M+ρV) $v^2$, with v=speed of the assembly 4 and therefore of the rod 10 in question.

Thus, the equation of the movement of the rod in the upper portion 27 of the guide tube 24 is as follows:

$$(M + \rho V)\frac{dv}{dt} = \Sigma f$$

This gives:

$$\frac{dv}{dt} = c2 - c1v^2$$

with c1=hydraulic friction in the guide tube and $$c2 = \frac{fg + fa + fc + fm}{M + \rho V}$$

C1 and c2 are, for example, experimental data measured during drop tests of the control cluster 4. These data are, with the other data necessary for the calculation, such as the mass and the volume of the assembly 4 and the drive rod thereof, introduced, for example, in the form of a file 43 by way of the input/output arrangement 38.

The computer 34 resolves the equation of the movement of the control rod 10, for example, using the NEWTON method.

Figure 6:
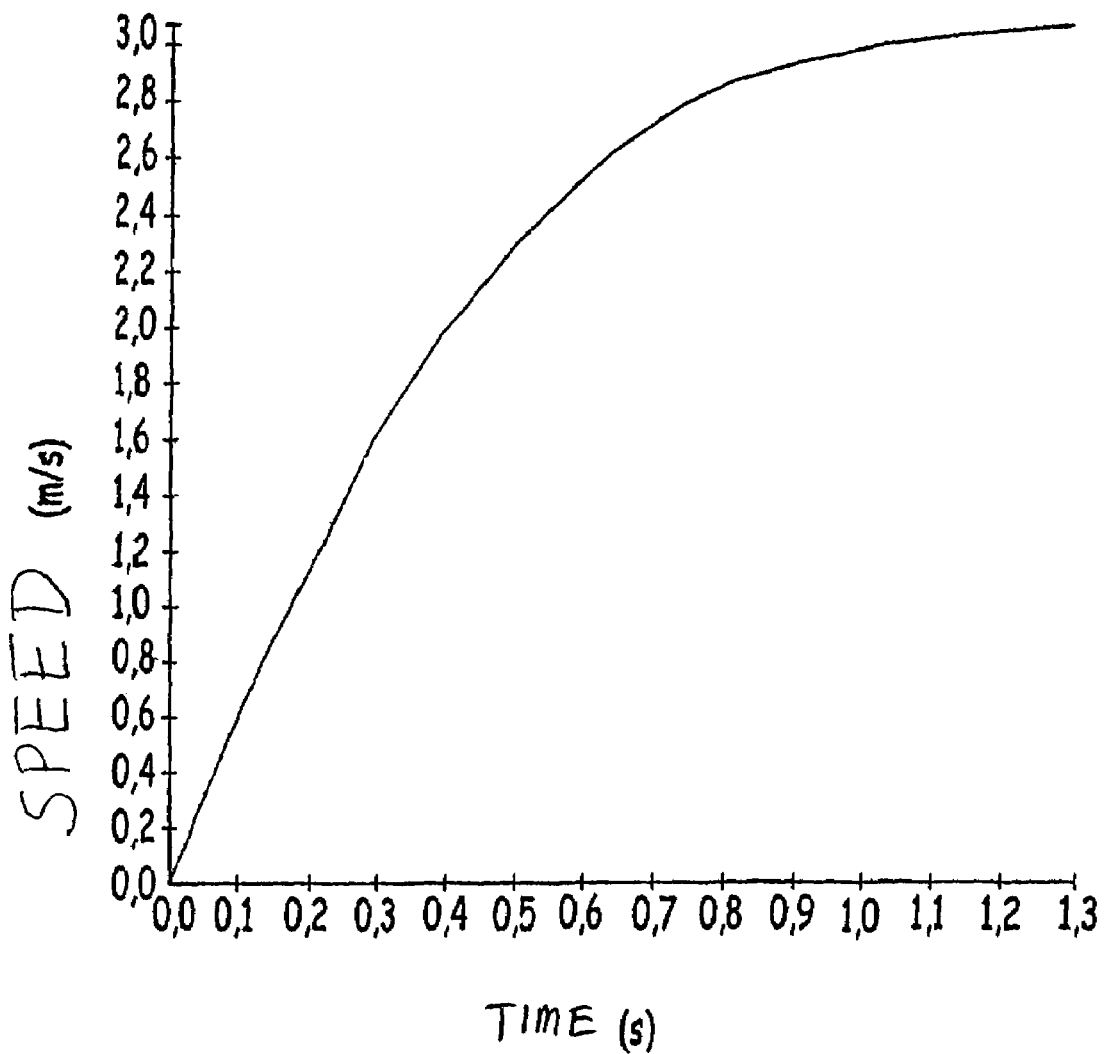
FIG. 6 is a progression curve of the falling speed of a control rod before it is introduced in the lower portion of the corresponding guide tube, this progression being calculated by the system of FIG. 4.

Thus, the progression of the speed of the control rod 10 in the upper portion 27 is known as a function of time. The profile established in this manner can be displayed in the form of a curve by the display arrangement 40. This curve is illustrated by FIG. 6.

In this manner, at the end of the step illustrated by the box 42, the speed of the control rod 10 is known at the point of entry to the lower damping portion 26 of the guide tube 24.

Based on the results of the step of box 42, the computer 34 calculates the progression of the speed of the control rod 10 during its fall in the lower damping portion 26.

This step is schematically illustrated by box 44.

This step can be performed using the following equation:

$$-\frac{dv}{dt} = c2 - \left(c1 + \frac{SCA \times NCA \Delta P}{M + \rho V v^2}\right)v^2 \text{ with}$$

$$c2 = \frac{fg + fa}{M + \rho V} = \frac{M - \rho V}{M + \rho V}g$$

SCA=cross-section of the rod 10 and

NCA=number of rods 10 in the assembly 4.

Therefore, the hypothesis that $f_c$ and $f_m$, are negligible is applied here.

The difference ΔP represents the elevated pressure produced in the cooling liquid contained in the guide tube 24, for example, the pressure thereof between the lower end of the rod 10 and the pressure present in the upper portion 27 of the guide tube 24.

ΔP can be established by the following formula:

$$\Delta P = \frac{1}{2}\rho Q^2 v^2 (EXPA + CONTRA + FECR \times CISA \times z) \text{ where}$$

$$EXPA = \left(\frac{SCA}{SACM}\left(1\frac{SACM}{SACTG}\right)\right)^2$$

with SM=cross-section of the lower portion 26, SACM=SM−SCA=cross-section of the annular space between the rod 10 and the lower portion 26, SACTG=STG−SCA, where STG is the cross-section of the upper portion 27 of the guide tube 24, $$CONTRA = 0.4\left(1\frac{SACM}{SM}\right)\left(\frac{SCA}{SACM}\right)^2$$

FECR=coefficient of loss of load owing to friction in the lower portion 26, $$CISA = \left(\frac{SCA}{SM}\right)^2 \frac{1}{DM}$$

DM=mean diameter of the guide tube 24 in the upper portion 27, z=height of the rod 10 introduced in the lower portion 26 of the guide tube 24, and Q=fraction of liquid flowing upwards out of the lower portion 26

The resolution of the equations governing the movement of the rod 10 after entry into the lower portion 26 is carried out by the computer 34, for example, using the RUNGE-KUTTA method.

Thus, at the end of step 44, the progression of the speed of the control rod 10 in the lower portion 26 of the guide tube 24 is known before the impact of the spider 11 on the upper end piece 7.

Figure 7:
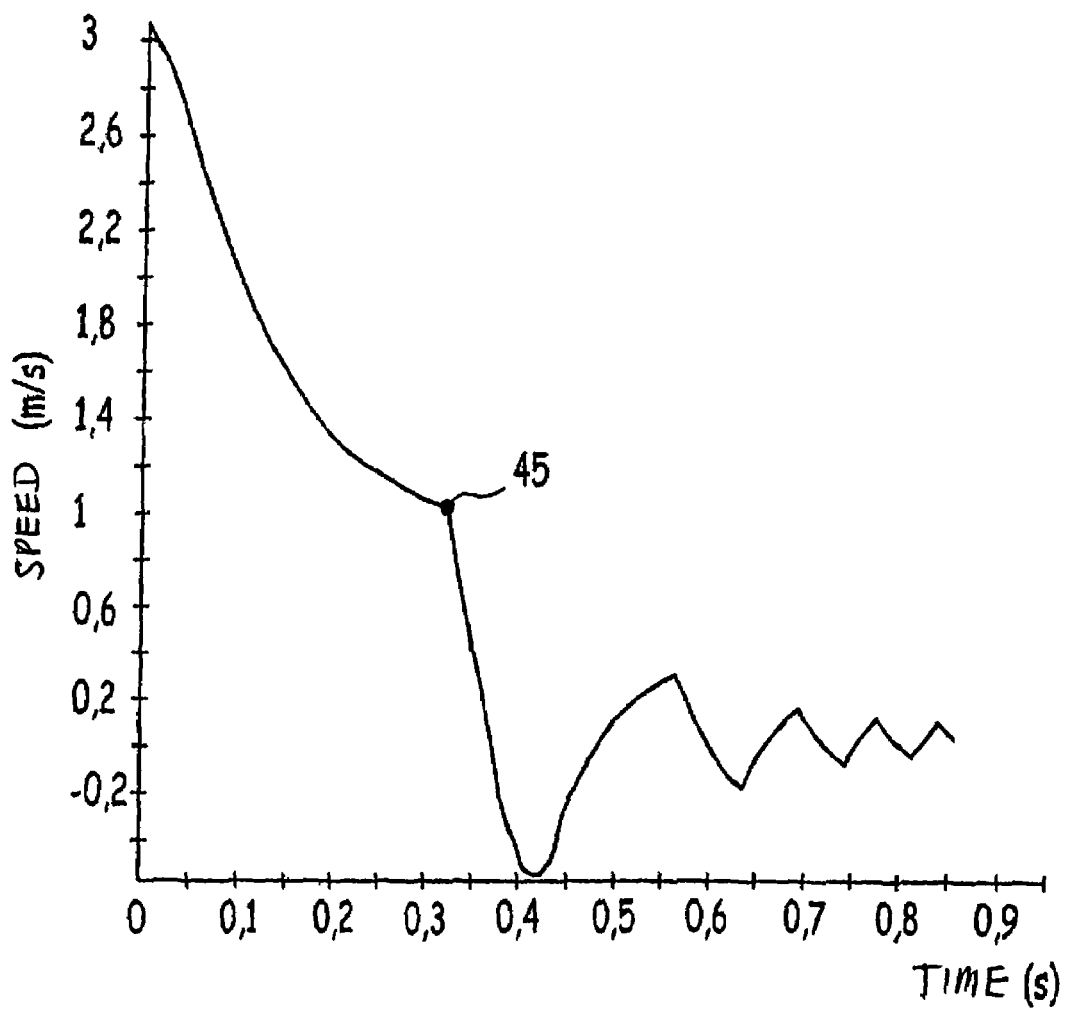
FIG. 7 is a progression curve of the falling speed of the same control rod in the lower portion of the corresponding guide tube, this progression being calculated by the system of FIG. 4.

The speed profile established in this manner can be displayed, for example, by the arrangement 40, as illustrated in FIG. 7. On the curve in FIG. 7, the speed profile established during step 44 is the portion located to the left of the point 45.

The computer 34 then performs, in the step of box 46, the calculation of the maximum elevated pressure produced $\Delta P_{MAX}$.

This calculation can be performed, for example, based on the formula:

$$\Delta P = \frac{1}{2}\rho Q^2 v^2 (EXPA + CONTRA + FECR \times CISA \times z).$$

The computer 34 performs, in the step 48, the calculation of a circumferential stress and maximum normal $\sigma_{\theta MAX}$, to which the lower portion 26 of the guide tube 24 is subjected due to the maximum elevated pressure $\Delta P_{MAX}$.

This stress can be calculated based on the formula:

$$\sigma_{\theta MAX} = \frac{1}{2}\Delta P_{MAX}\left(\frac{DPM}{EMP}+1\right)$$

where DPM=inside diameter of the lower portion 26 and EMP=minimum thickness of the wall of the lower portion 26.

The system 32 can then provide, due to the input/output arrangement 38, a first result in the form of a file 49 containing the value $\sigma_{\theta MAX}$ established, and optionally the maximum elevated pressure $\Delta P_{MAX}$ established.

Next, the system 32 performs the calculation of the progression of the speed of the control rod 10 after it comes into contact with the spider 11 and the upper end piece 7.

This calculation step is illustrated by the box 50 in FIG. 5.

This calculation can be performed, for example, using the following equation when the ring 20, and therefore the spider 11, is in contact with the upper end piece 7:

$$(M+\rho V)\frac{dv}{dt} = (M-\rho V)g - PRCH - K(z-LAI) - c3v$$

with PRCH=preload of the spring 16=PRCMP×K, where PRCMP is the precompression of the spring 16 and K the rigidity of the spring 16, LAI=distance traveled by the control rod in the lower portion 26 before impact, and c3=coefficient of hydraulic damping in order to model the damping in the lower portion 26.

In the event of a rebound, for example, when the spider 11 is no longer in contact with the upper end piece 7, the equation for movement of the control rod 10 in question is written as follows:

$$(M+\rho V)\frac{dv}{dt} = (M-\rho V)g - c3v$$

These two equations are integrated by the computer 34, for example, using the RUNGE-KUTTA method.

Therefore, the step 50 allows the kinematics of the control cluster 4 to be established during the mechanical damping of the shock by the spring 16.

The speed profile established in this manner can be displayed, for example, by the arrangement 40. This profile corresponds to the portion located to the right of the point 45 on the curve in FIG. 7.

Based on the results of this step, the system 32 performs, in the step 52, the calculation of a maximum vertical compression force $F_{MAX}$, to which the spring 16 is subjected during the mechanical damping.

This calculation can be carried out, for example, based on the following formula:

$$F_{MAX} = MAX\{K(z-LAI) + PRCH\}$$

The system 32 then performs, in the step of box 54, the calculation of an approximate maximum shearing stress $\tau_{MAX}$ in the spring 16:

$$\tau_{MAX} = \frac{8F_{MAX}DFN}{\pi DFR^3}$$

with DFN=DER−DFR and

DER=outside diameter of the spring 16,

DFR=diameter of the wire of the spring 16.

Subsequently, the system 32 can optionally perform, based on the maximum stress $\tau_{MAX}$, the calculation of maximum corrected stresses.

These stresses can be calculated by multiplying $\tau_{MAX}$ by different factors.

Thus, it is possible to calculate:

$$\tau_{MAX1} = \tau_{MAX} \times K_c \text{ and}$$

$$\tau_{MAX2} = \tau_{MAX} \times K \text{ with}$$

$$Kc = 1 + \frac{0.5}{C},$$

$$C = \frac{DFN}{DFR}, \text{ and}$$

$$K = \frac{4C-1}{4C-4} + \frac{0.615}{C}$$

The stress $\tau_{MAX1}$ corresponds to the shearing stress along the neutral axis FN (FIG. 2) of the spring 16. The stress $\tau_{MAX2}$ corresponds to the stress along the axis F2 (FIG. 2) of the spring 16 nearest the vertical center axis A of the spring 16 (see FIG. 2).

At the end of this step illustrated by the box 56, the system 32 provides the various maximum shearing stresses calculated, for example, in the form of data stored in a file 57, which are transmitted by the input/output arrangement 38.

Based on the data contained in the files 49 and 57, which have also been stored in the storage means 36, the computer 34 will verify that the maximum stresses calculated are indeed acceptable for the materials which respectively constitute the guide tube 24 and the helical spring 16.

This step has been schematically illustrated by the box 58 in FIG. 5. During such a step, the system 32 will, for example, verify that the maximum shearing stresses calculated during the steps 54 and 56 are less than maximum values admissible by the material which constitutes the spring 16. This verification is performed by a comparison of $\tau_{MAX}$, $\tau_{MAX1}$ and $\tau_{MAX2}$ with a maximum value admissible by the material of the spring 16.

As far as the maximum circumferential stress $\sigma_{\theta max}$ is concerned, the verification can be carried out based on a formula of the type:

$$f(\sigma_{\theta MAX}) < \sigma_{admissible}$$

where $\sigma_{admissible}$ refers to the material which constitutes the lower portions 26 of the guide tubes 24.

The function f can be a function which takes into consideration other stresses to which the guide tubes 24 can be subjected. Such a stress can be a vertical compression stress $\sigma_A$, to which the guide tubes 24 are subjected during the contact of the springs 8 of the upper end piece 7 against the upper bearing plate of the core in order to counterbalance the hydrostatic thrust during operation.

Thus, the function f can be, for example, in the form of $$f(\sigma_{\theta MAX}, \sigma_A) = \sigma_{\theta MAX} + \sigma_A$$

It will be appreciated that this last step, illustrated by the box 58, can be performed by separate software which generally performs the validation of various design parameters of the assembly 1 based on results provided by various pieces of software each dedicated to taking into consideration specific operating conditions and which include the software which performs the steps 42, 44, 46, 48, 50, 52, 54 and 56.

In general terms, the file 43 comprising the data 43 used by the method for the various calculations can comprise the data of Table 1 below.

TABLE 1

| | | |
|---|---|---|
| outside diameter of control rod 10 | (m) | Nominal; maximum |
| inside diameter of upper portion 27 | (m) | Nominal; maximum |
| inside diameter of lower portion 26 | (m) | Nominal; maximum |
| total length of lower portion 26 | (m) | |
| damping travel before impact | (m) | |
| minimum thickness of wall of lower portion 26 | (m) | |
| maximum roughness of rod 10/tube 24 | (m) | Nominal; tolerance |
| diameter of aperture 29 | (m) | |
| length of aperture 29 | (m) | |
| roughness of aperture 29 | (m) | |
| moving mass IVI | (kg) | |
| volumetric mass of liquid | (kg/m³) | |
| kinematic viscosity of liquid | (m²/s) | |
| c1 | (/m) | |
| c2 | (m/s²) | |
| Young's modulus of guide tube 24 | (Pa) | |
| Poisson's ratio of wide tube 24 | | |
| spring precompression 16 | (m) | |
| preloading of spring 16 | (N) | |
| length of spring 16 with contiguous turns | (m) | |
| outside diameter of spring 16 | (m) | |
| diameter of wire of spring 16 | (m) | |
| compression when upper head 12 is in contact with (upper end piece 7) | (m) | |
| END | | |

Similarly, the file 49 comprising the results from step 48 can comprise the data of Table 2 below.

TABLE 2

| | |
|---|---|
| $\Delta P_{MAX}$: maximum elevated pressure in lower portion 26 | (Pa) |
| $Z_{MAX}$: corresponding penetration in lower portion 26 | (m) |
| $\sigma_{\theta MAX}$: maximum stress in lower portion 26 | (Pa) |
| fmax: maximum force on lower end piece 6 | (N) |
| tdur: duration of fall in lower portion 26 before impact | (s) |
| vfin: speed of impact of assembly 4 on upper end piece 7 | (m/s) |

The file 57 comprising the results of step 56 can itself contain the data of Table 3 below.

TABLE 3

| | |
|---|---|
| $F_{MAX}$: maximum compression force on spring 16 | (N) |
| $h_{MAX}$: maximum deflection of spring 16 | (m) |
| $\tau_{MAX}$: approximate maximum stress in spring | (Pa) |
| $\tau_{MAX1}$: approximate maximum stress corrected by Kc | (Pa) |
| $\tau_{MAX2}$: approximate maximum stress corrected by K (Wahl coefficient) | (Pa) |

It has been possible to verify by experiment that the maximum elevated pressures and the maximum stresses obtained by means of steps 42, 44, 46 and 48 were reliable. In this manner, the first corresponding part of the method allows reliable guide tubes 24 to be designed. Furthermore, this first part calculates only a single stress which appears to be the pertinent stress for the conditions being considered. Consequently, this first part of the method allows the security margins to be limited during design, and therefore assemblies which are relatively light and economical to be designed.

The second part of the method, which corresponds to steps 50, 52, 54 and 56, also allows maximum stresses to be reliably calculated, as confirmed by experiment.

Thus, the second part of the method allows a reliable design to be arrived at by calculation for the spider springs 16, which design is found to be advantageous in comparison with the method of tests alone which is currently imposed by provisions. It will be appreciated that the second part of the method calculates only the small number of stresses, and in particular those on the axis F2 of the spring 16 nearest the center axis A of the spring, which are found to be pertinent to the conditions envisaged. In this manner, the second part of the method allows the design margins to be reduced.

In more general terms, the steps 42, 44, 46 and 48, on the one hand, and 50, 52, 54 and 56, on the other, can be carried out by separate pieces of software.

In order to increase the reliability of the calculation, for carrying out the first part of the method it is possible to use, as the passage gap J, the nominal value of the gap, or this nominal value corrected by the manufacturing tolerance, or a value resulting from statistical studies of the distribution of passage gaps J obtained in constructed assemblies.

In a variant, it is possible to use a gap value J which is greater for steps 42 and 44 and a smaller gap value J for steps 46 and 48. This allows a high stress value $\sigma_{\theta MAX}$ to be calculated because the speed reached during the fall of the rod 10 in question is high and the volume available in the lower portion 26 for the liquid during damping is small. However, this high stress value is not unrealistic and therefore does not lead to unjustified design margins, as illustrated by the following example.

According to a specific variant, the upper value can be a maximum value for gap J which is verified with a given probability, for example, 95%, in constructed assemblies, and the lower value can be a minimum value obtained with the same probability. This variant allows an approximation of the situation where a single pair comprising a guide tube/control rod has minimum gap J, where the maximum stress $\sigma_{\theta MAX}$ would be reached, and where all the other pairs comprising a guide tube/control rod have the maximum passage gap J, which would be the most extreme case.

In some variants, the first part of the method could also take into consideration forms of the lower damping portion 26 which are different from those described previously. In this manner, these lower damping portions could have a plurality of successive portions of reduced diameter, optionally separated by portions of increased diameter, generally referred to as cavities. In some variants, the first part of the method is carried out with collared screws 28 which are not perforated by holes 29.

In still more general terms, the first part and the second part of the design method described can be used independently of each other. In this manner, it is possible to carry out the second part relating to the design of the spring 16 without referring to the calculation of the elevated pressure $\Delta P$ and the stress $\sigma_{\theta MAX}$.

The invention claimed is:

1. A method for designing a nuclear fuel assembly which is intended to be positioned in a nuclear reactor, the assembly comprising a plurality of guide tubes and a control cluster which comprises a plurality of control rods and a support for the control rods, the control rods and the guide tubes extending in parallel with a longitudinal direction, each of the control rods being received in a guide tube in order to form pairs comprising guide tubes/control rods, each of the guide tubes comprising a lower damping portion which comprises at least a section of reduced inside diameter, the lower damping portion configured to contain a fluid for damping a fall of the control rod which is received in the guide tube, the section of reduced inside diameter surrounding the control rod with a radial passage gap when the control rod is introduced in the guide tube, the method comprising:

calculating an expected falling speed of the control rods upon entry into the lower damping portions when the control cluster falls in an event of a shutdown of the nuclear reactor;

calculating, based on the falling speed, a progression of the falling speed of the control rods in the lower damping portions;

calculating, based on the progression of the falling speed of the control rods in the lower damping portions, a maximum elevated pressure produced in the fluid contained in the lower damping portions;

calculating, based on the maximum elevated pressure, a maximum circumferential stress produced in the lower damping portions; and designing the guide tubes as a function of the maximum circumferential stress so that a maximum stress admissible by the guide tube is not exceeded.

2. A method for designing a nuclear fuel assembly which is intended to be positioned in a nuclear reactor, the assembly comprising a plurality of guide tubes and a control cluster which comprises a plurality of control rods and a support for the control rods, the control rods and the guide tubes extending in parallel with a longitudinal direction, each of the control rods being received in a guide tube in order to form pairs comprising guide tubes/control rods, each of the guide tubes comprising a lower damping portion which comprises at least a section of reduced inside diameter, the lower damping portion configured to contain a fluid for damping a fall of the control rod which is received in the guide tube, the section of reduced inside diameter surrounding the control rod with a radial passage gap when the control rod is introduced in the guide tube, the method comprising:

calculating an expected falling speed of the control rods upon entry into the lower damping portions when the control cluster falls in an event of a shutdown of the nuclear reactor;

calculating, based on the falling speed, a progression of the falling speed of the control rods in the lower damping portions;

calculating, based on the progression of the falling speed of the control rods in the lower damping portions, a maximum elevated pressure produced in the fluid contained in the lower damping portions;

calculating, based on the maximum elevated pressure, a maximum circumferential stress produced in the lower damping portions; and designing the guide tubes as a function of the maximum circumferential stress; and verifying, using the maximum circumferential stress, that a maximum stress admissible by the guide tube has not been exceeded.

3. The method according to claim 1, wherein the calculating, based on the falling speed, of a progression of the falling speed of the control rod in the lower damping portion, is performed using a higher value for the radial passage gap and the step of calculating, based on the progression of the falling speed of the control rod in the lower damping portion, a maximum elevated pressure produced in the fluid contained in the lower damping portion, is performed using a lower value for the radial passage gap.

4. The method according to claim 3, wherein the higher value is the maximum statistical value for the passage gap.

5. The method according to claim 3, wherein the lower value is the minimum statistical value for the passage gap.

6. The method according to claim 2, wherein the calculating, based on the falling speed, of a progression of the falling speed of the control rod in the lower damping portion, is performed using a higher value for the radial passage gap and the step of calculating, based on the progression of the falling speed of the control rod in the lower damping portion, a maximum elevated pressure produced in the fluid contained in the lower damping portion, is performed using a lower value for the radial passage gap.

7. The method according to claim 6, wherein the higher value is the maximum statistical value for the passage gap.

8. The method according to claim 6, wherein the lower value is the minimum statistical value for the passage gap.

* * * * *